US009401649B2

(12) United States Patent
Sasaki

(10) Patent No.: US 9,401,649 B2
(45) Date of Patent: Jul. 26, 2016

(54) SWITCHING CONVERTER

(71) Applicant: ROHM CO., LTD., Ukyo-Ku, Kyoto (JP)

(72) Inventor: Yoshikazu Sasaki, Kyoto (JP)

(73) Assignee: ROHM CO., LTD., Ukyo-Ku, Kyoto (JP)

( * ) Notice: Subject to any disclaimer, the term of this patent is extended or adjusted under 35 U.S.C. 154(b) by 0 days.

(21) Appl. No.: 14/928,374

(22) Filed: Oct. 30, 2015

(65) Prior Publication Data

US 2016/0126848 A1 May 5, 2016

(30) Foreign Application Priority Data

Nov. 4, 2014 (JP) ................. 2014-224445

(51) Int. Cl.
*H05B 33/08* (2006.01)
*H02M 3/335* (2006.01)
*G02F 1/1335* (2006.01)

(52) U.S. Cl.
CPC ..... *H02M 3/33515* (2013.01); *G02F 1/133603* (2013.01); *H05B 33/0815* (2013.01)

(58) Field of Classification Search
CPC ........... H05B 33/0815; H05B 33/0827; H05B 33/0818; H05B 33/0851
USPC ....................................................... 315/307
See application file for complete search history.

(56) References Cited

U.S. PATENT DOCUMENTS

| 8,664,883 B2* | 3/2014 | Hiramatu | 315/291 |
| 8,975,826 B1* | 3/2015 | Stevens | H05B 33/0815 315/185 S |
| 2012/0249001 A1* | 10/2012 | Okubo | H05B 33/0851 315/200 R |
| 2012/0299512 A1* | 11/2012 | Watanabe | H05B 33/0845 315/307 |
| 2013/0119881 A1* | 5/2013 | Fang | H05B 33/0815 315/210 |
| 2015/0084544 A1* | 3/2015 | Mitterbacher | H05B 33/0818 315/294 |
| 2015/0173143 A1* | 6/2015 | Zhang | H05B 33/0827 315/185 R |
| 2015/0312982 A1* | 10/2015 | Melanson | H05B 33/0815 315/287 |
| 2016/0036324 A1* | 2/2016 | Hofmann | H05B 33/0815 315/210 |
| 2016/0066388 A1* | 3/2016 | Seki | H05B 33/0815 315/200 R |

FOREIGN PATENT DOCUMENTS

| JP | 2003153529 A | 5/2003 |
| JP | 2004047538 A | 2/2004 |

* cited by examiner

*Primary Examiner* — Don Le
(74) *Attorney, Agent, or Firm* — Cantor Colburn LLP

(57) ABSTRACT

When a current detection voltage $V_{CS}$ that corresponds to a voltage drop across a detection resistor $R_{CS}$ exceeds a first threshold value $V_{ADIM}$, a current limit comparator asserts a reset pulse. A zero current detection circuit generates a set pulse configured as an instruction to turn on a switching transistor. A logic circuit generates an output pulse S14 according to the reset pulse and the set pulse. When the current detection signal $V_{CS}$ exceeds a second threshold value $V_{TH}$, a second comparator asserts a comparison signal. An abnormal state detection period is set to a first time period from a time point at which the switching transistor turns on. When the comparison signal is asserted in the abnormal state detection period, an abnormal state detection circuit judges that an abnormal state has occurred.

29 Claims, 12 Drawing Sheets

500a

500b

600

US 9,401,649 B2

SWITCHING CONVERTER

CROSS-REFERENCE TO RELATED APPLICATIONS

The present invention claims priority under 35 U.S.C. §119 to Japanese Application No. 2014-224445, filed Nov. 4, 2014, the entire content of which is incorporated herein by reference.

BACKGROUND OF THE INVENTION

1. Field of the Invention

The present invention relates to a switching converter.

2. Description of the Related Art

As a backlight of a liquid crystal panel or as an illumination device, semiconductor light sources such as LEDs (light-emitting diodes) have been becoming popular. In recent years, in the field of LED illumination devices, the development of step-down switching converters has been advancing. FIG. 1 is a circuit diagram showing a step-down switching converter investigated by the present inventors. A switching converter $100r$ receives an input voltage $V_{IN}$ from an unshown power supply, and steps down the input voltage $V_{IN}$ thus received, so as to output an output voltage $V_{OUT}$ to an LED light source 502 that functions as a load. Furthermore, the switching converter $100r$ stabilizes a current (which is referred to as a "load current" or "driving current") that flows through the LED light source 502 to a target value $I_{REF}$. For example, the LED light source 502 is configured as a light-emitting diode (LED) string. The switching converter $100r$ sets the target current value $I_{REF}$ of the load current $I_{LED}$ according to a target luminance set for the LED string.

The switching converter $100r$ includes an output circuit 102 and a control circuit $200r$. The output circuit 102 includes a smoothing capacitor C1, a rectifier diode D1, a switching transistor M1, an inductor L1, an auxiliary winding L2, and a detection resistor $R_{CS}$.

In the on period of the switching transistor M1, a current that flows through the switching transistor M1 also flows through the detection resistor $R_{CS}$. A voltage drop (detection voltage) $V_{CS}$ that occurs at the detection resistor $R_{CS}$ is fed back to a current detection (CS) terminal of the control circuit $200r$.

The control circuit 200 includes a current limit comparator 202, a zero current detection circuit 204, a logic circuit 206, and a driver 208.

FIG. 2 is an operation waveform diagram showing the operation of the switching converter $100r$ shown in FIG. 1. During a period in which the switching transistor M1 is turned on (on period), the coil current $I_L$ corresponds to a current $I_{M1}$ that flows through the switching transistor M1, which flows through the LED light source 502, the inductor L1, the switching transistor M1, and the detection resistor $R_{CS}$. As the output current $I_{OUT}$ increases, the current detection signal $V_{CS}$ rises. The current limit comparator 202 compares the current detection signal $V_{CS}$ with a target voltage $V_{ADIM}$ that is set according to the target current value $I_{REF}$. When the current detection signal $V_{CS}$ reaches the target voltage $V_{ADIM}$, i.e., when the output current $I_{OUT}$ reaches a limit current $I_{LIM}$ (=$V_{ADIM}/R_{CS}$), a limit current detection signal S1 is asserted (e.g., set to high level). In the on period, the energy stored in the inductor L1 increases.

When the limit current detection signal S1 is asserted, the logic circuit 206 switches a pulse signal S2 to an off level (e.g., low level) corresponding to the off state of the switching transistor M1. The driver 208 turns off the switching transistor M1 according to the pulse signal S2.

During an off period of the switching transistor M1, the output current $I_{OUT}$ corresponds to a current $I_{D1}$ that flows through the rectifier diode D1, which flows through the LED light source 502, the inductor L1, and the rectifier diode D1. With the passage of the off time, the energy stored in the inductor L1 decreases, which decreases the output current $I_{OUT}$.

The auxiliary winding L2 is coupled with the inductor L1, which forms a transformer T1. A voltage $V_{ZT}$ at the auxiliary winding L2 is input to a zero-crossing detection (ZT) terminal of the control circuit $200r$. A zero current detection circuit 204 detects, based on the voltage $V_{ZT}$ that occurs at the auxiliary winding Lz, a state in which the output current $I_{OUT}$ that flows through the inductor L1 becomes zero (zero-crossing point). In this state, the zero current detection circuit 204 asserts a zero-crossing detection signal S3.

When the zero-crossing detection signal S3 is asserted, the logic circuit 206 switches the pulse signal S2 to an on level (e.g., high level) corresponding to the on state of the switching transistor M1. The driver 208 turns on the switching transistor M1 according to the pulse signal S2.

The control circuit $200r$ repeats the aforementioned operation. The load current $I_{LED}$ is obtained by smoothing the output current $I_{OUT}$ by means of a smoothing capacitor C1. With such an arrangement, the target current value $I_{REF}$ is represented by $I_{LIM}/2$.

As shown in FIG. 2, immediately after the output pulse signal $S_{OUT}$ of the driver 208 transits to the on level, there is a great sudden increase in the current detection signal $V_{CS}$ due to surge noise. In order to prevent the output (limit current detection signal) S1 of the current limit comparator 202 from being asserted before the output current $I_{OUT}$ reaches the limit current $I_{LIM}$, a mask time $T_{MSK}$ having a predetermined length is set immediately after the switching transistor M1 is turned on. During the mask time $T_{MSK}$, the comparison result obtained by the current limit comparator 202 is ignored. This operation is also referred to as "leading edge blanking (LEB)".

As a result of investigating the switching converter $100r$ shown in FIG. 1, the present inventors have come to recognize the following problems. In a case in which a malfunction or an abnormal state such as a short-circuit state has occurred due to the occurrence of a malfunction in the LED light source 502, in some cases, this leads to a large amount of current flowing through a circuit element, resulting in a problem of heat generation. Also, in some cases, this leads to high voltage across a circuit element that exceeds its breakdown voltage, resulting in an adverse effect on the circuit reliability. Such a problem can occur not only in the LED light source 502, but also in various kinds of loads.

SUMMARY OF THE INVENTION

The present invention has been made in order to solve such a problem. Accordingly, it is an exemplary purpose of an embodiment of the present invention to provide a switching converter and a control circuit for such a switching converter which are capable of detecting a malfunction and an abnormal state.

An embodiment of the present invention relates to a control circuit for a switching converter. The switching converter comprises: an output capacitor arranged between an input line and an output line; an inductor, a switching transistor, and a detection resistor arranged in series between the output line and a ground line; and a diode having a cathode connected to the input line and an anode connected to a connection node that connects the inductor and the switching transistor. The control circuit comprises: a first comparator that asserts a reset pulse when a current detection signal that corresponds to a voltage drop across the detection resistor exceeds a first threshold value; a set pulse generator that asserts a set pulse at a timing at which the switching transistor is to be turned on; a logic circuit that receives the set pulse and the reset pulse, and that generates an output pulse such that (i) when the set pulse is asserted, the output pulse is switched to an on level that corresponds to an on state of the switching transistor, and such that (ii) when the reset pulse is asserted, the output pulse is switched to an off level that corresponds to an off state of the switching transistor; a second comparator that asserts a comparison signal when the current detection signal exceeds a second threshold value; and an abnormal state detection circuit that sets an abnormal state detection period to a period from a time point at which the switching transistor turns on up to a time point at which a first time period elapses, and that judges that an abnormal state has occurred when the comparison signal is asserted in the abnormal state detection period.

As a result of investigating such a switching converter, the present inventor has come to recognize the following. That is to say, when the switching transistor turns on in a state in which the switching converter operates abnormally, a large current flows through the inductor, which rapidly raises the current detection signal. Thus, by setting an abnormal state detection period immediately after the switching transistor turns on, and by judging whether or not the current detection signal exceeds the second threshold value in the abnormal state detection period thus set, such an arrangement is capable of detecting an abnormal state and malfunction that occurs in the switching converter.

Also, the first threshold value and the second threshold value may be equivalent. Also, the first comparator and the second comparator may be configured employing a single shared comparator. Also, the reset pulse may be the same as the comparison signal.

Also, the abnormal state detection circuit may judge that an abnormal state has occurred when assertion of the comparison signal that occurs in the abnormal state detection period continues throughout a predetermined judgment time period.

The present inventor has further come to recognize that, in some cases, depending on the circuit constant of the inductor, the capacitor, or the like, of the switching converter, a high voltage is applied to the inductor immediately after the switching converter is started up, leading to a problem in that the current detection signal rises rapidly even if the switching converter operates normally. In order to solve such a problem, by making an abnormal state judgment using the judgment time period set to be longer than the start-up time, such an arrangement is capable of preventing false detection in the start-up operation.

Also, the abnormal state detection circuit may comprise: a first timer circuit that generates a first timer signal that is asserted during the first time period from the time point at which the switching transistor turns on; an intermediate judgment unit that receives the first timer signal and the comparison signal, and that outputs an intermediate judgment signal such that (i) when the first timer signal is asserted and the comparison signal is asserted, the intermediate judgment signal is asserted, and such that (ii) when the first timer signal is negated and the comparison signal is asserted, the intermediate judgment signal is negated; and a final judgment unit that asserts a final judgment signal when the intermediate judgment signal is continuously asserted throughout the judgment time period.

Also, when assertion of the comparison signal that occurs in the abnormal state detection period continues throughout a predetermined number of cycles, the abnormal state detection circuit may judge that an abnormal state has occurred.

By making an abnormal state judgment under a condition in which the predetermined number of cycles is set to be longer than the start-up time, such an arrangement is capable of preventing false detection in the start-up operation.

Also, the abnormal state detection circuit may comprise: a first timer circuit that generates a first timer signal which is asserted during the first time period from the time point at which the switching transistor turns on; an intermediate judgment unit that receives the first timer signal and the comparison signal, and that outputs an intermediate judgment signal such that (i) when the first timer signal is asserted and the comparison signal is asserted, the intermediate judgment signal is asserted, and such that (ii) when the first timer signal is negated and the comparison signal is asserted, the intermediate judgment signal is negated; and a final judgment unit that receives the intermediate judgment signal and the output pulse, and that asserts a final judgment signal when the output pulse transits to the on level the predetermined number of times in a period in which the intermediate judgment signal is asserted.

Also, the intermediate judgment unit may comprise: a first gate that receives the first timer signal and the comparison signal, and that outputs an abnormal state detection signal which is asserted when the first timer signal is asserted and the comparison signal is asserted; a second gate that receives the first timer signal and the comparison signal, and that outputs a cancel signal which is asserted when the first timer signal is negated and the comparison signal is asserted; and a flip-flop that receives the abnormal state detection signal via a clock terminal thereof, that receives the cancel signal via a reset terminal thereof, and that outputs an intermediate judgment signal such that, when the abnormal state detection signal is asserted, the intermediate judgment signal is asserted, and such that, when the cancel signal is asserted, the intermediate judgment signal is negated.

Also, the final judgment unit may comprise: a capacitor; a current source that charges the capacitor during a period in which the intermediate judgment signal is asserted; a switch that discharges the capacitor when the intermediate judgment signal is negated; and a comparator that compares a voltage across the capacitor with a predetermined threshold voltage.

Also, the final judgment unit may comprise a counter arranged such that the output pulse is input to a clock terminal thereof, and such that the intermediate judgment signal is input to a reset terminal thereof.

Also, the abnormal state detection circuit may disable abnormal state detection during a predetermined period of time after a start-up operation. Such an arrangement is capable of preventing false detection of an abnormal state immediately after the start-up operation.

Also, a mask period may be set to a predetermined second time period from a time point at which the switching transistor turns on. Also, the control circuit further comprise a leading edge blanking circuit that masks assertion of the reset pulse during the mask period, and that outputs a masked reset pulse to the logic circuit.

Also, the first time period and the second time period may be equivalent. In this case, the first timer signal and the second timer signal may be configured as a single signal. Thus, such an arrangement is capable of reducing the number of timer circuits, thereby allowing the circuit configuration to be simplified.

Also, the leading edge blanking circuit may comprise: a second timer circuit that generates a second timer signal which is asserted during the second time period from the time point at which the switching transistor turns on; and a third gate that receives the second timer signal and the reset pulse, and that generates a masked reset pulse.

Also, the first time period and the second time period may be equivalent. Also, the first comparator and the second comparator may be configured employing a single shared comparator. Also, the reset pulse and the comparison signal may be configured as a single signal.

Also, the abnormal detection circuit and the leading edge blanking circuit may share a timer circuit that generates a timer signal which is set to a predetermined level during the second time period from the time point at which the switching transistor turns on. Also, the abnormal state detection circuit may comprise: a first gate that receives the timer signal and the reset pulse, and that outputs an abnormal state detection signal which is asserted when the timer signal is asserted and the reset pulse is asserted; a second gate that receives the timer signal and the reset pulse, and that outputs a cancel signal which is asserted when the timer signal is negated and the reset pulse is asserted; and a flip-flop that receives the abnormal state detection signal via a clock terminal thereof, that receives the cancel signal via a reset terminal thereof, and that outputs an intermediate judgment signal such that, when the abnormal state detection signal is asserted, the intermediate judgment signal is asserted, and such that, when the cancel signal is asserted, the intermediate judgment signal is negated. Also, the leading edge blanking circuit may comprise a third gate that performs a logical operation on the timer signal and the reset pulse, so as to generate a masked reset pulse.

Also, the set pulse generator may assert the set pulse when a current that flows through the inductor becomes substantially zero.

In particular, the aforementioned abnormal state detection technique is effectively applied to a quasi-resonant (QR) operation mode that carries out soft switching.

Also, the switching converter may further comprise a first capacitor and a resistor arranged in series between a ground line and a connection node that connects the inductor and the switching transistor. Also, when an electric potential at the resistor crosses a predetermined threshold voltage, the set pulse generator may assert the set pulse.

Such an arrangement is capable of detecting whether or not the current that flows through the inductor becomes zero.

Also, the switching converter may further comprise an auxiliary winding coupled with the inductor. Also, when a voltage that develops at the auxiliary winding crosses a predetermined threshold voltage, the set pulse generator may assert the set pulse.

Such an arrangement is capable of detecting whether or not the current that flows through the inductor becomes zero.

Also, the set pulse generator may assert the set pulse after a predetermined off time period elapses from a time point at which the switching transistor turns on.

The aforementioned abnormal state detection technique may also be applied to an operation mode that carries out hard switching.

Also, when an abnormal state is detected, the control circuit may suspend its operation.

Also, the control circuit may monolithically be integrated on a single semiconductor substrate.

Examples of such a "monolithically integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants.

Another embodiment of the present invention relates to a switching converter. The switching converter comprises any one of the aforementioned control circuits.

Yet another embodiment of the present invention relates to an illumination apparatus. The illumination apparatus comprises: an LED light source comprising multiple LEDs (light-emitting diodes) connected in series; a rectifier circuit that rectifies and smooths a commercial AC voltage; and a switching converter that receives, as an input voltage, a DC voltage obtained by rectification and smoothing by means of the rectifier circuit, and that is arranged such that the LED light source functions as a load. The switching converter may comprise any one of the aforementioned control circuits.

Yet another embodiment of the present invention relates to an electronic device. The electronic device may comprise: a liquid crystal panel; and the aforementioned illumination apparatus configured as a backlight that irradiates a back face of the liquid crystal panel.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

Figure 1:
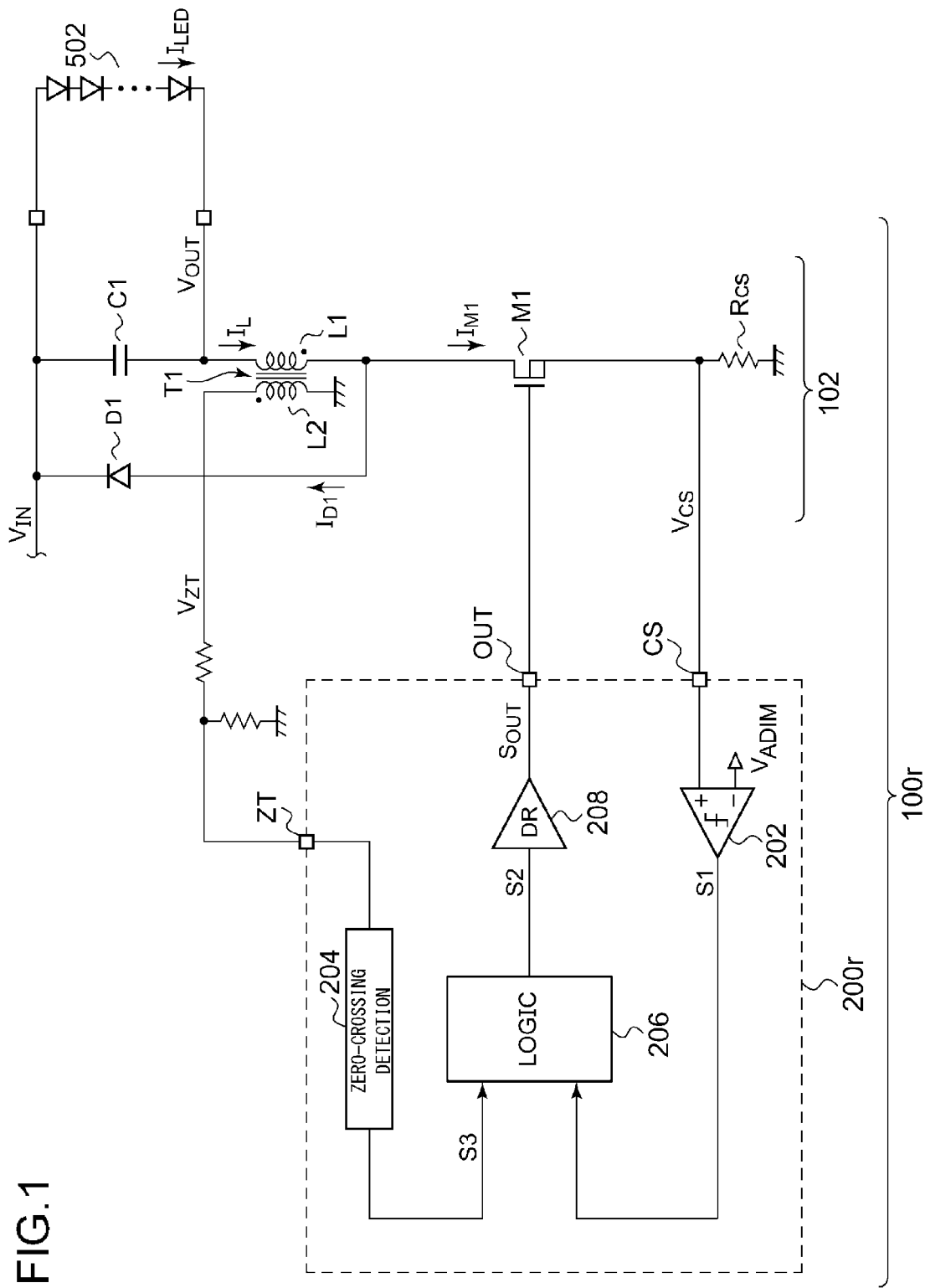
FIG. 1 is a circuit diagram showing a step-down switching converter investigated by the present inventors.
Figure 2:
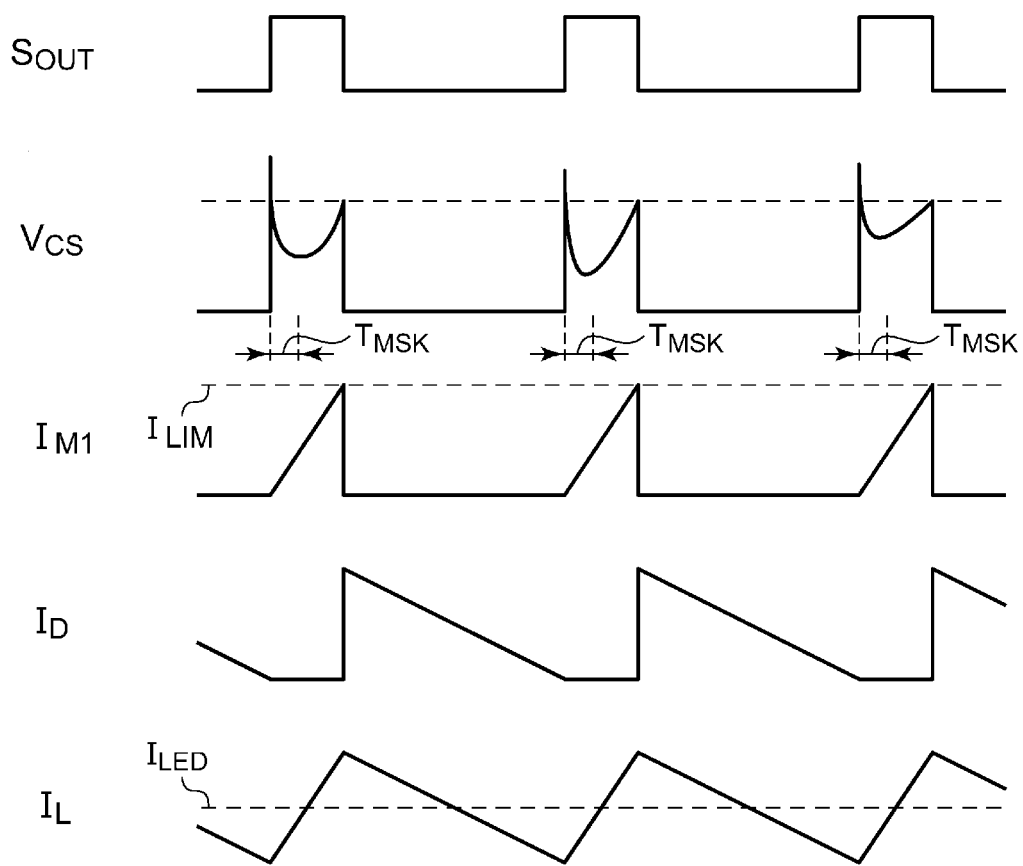
FIG. 2 is an operation waveform diagram showing the operation of the switching converter shown in FIG. 1.
Figure 3:
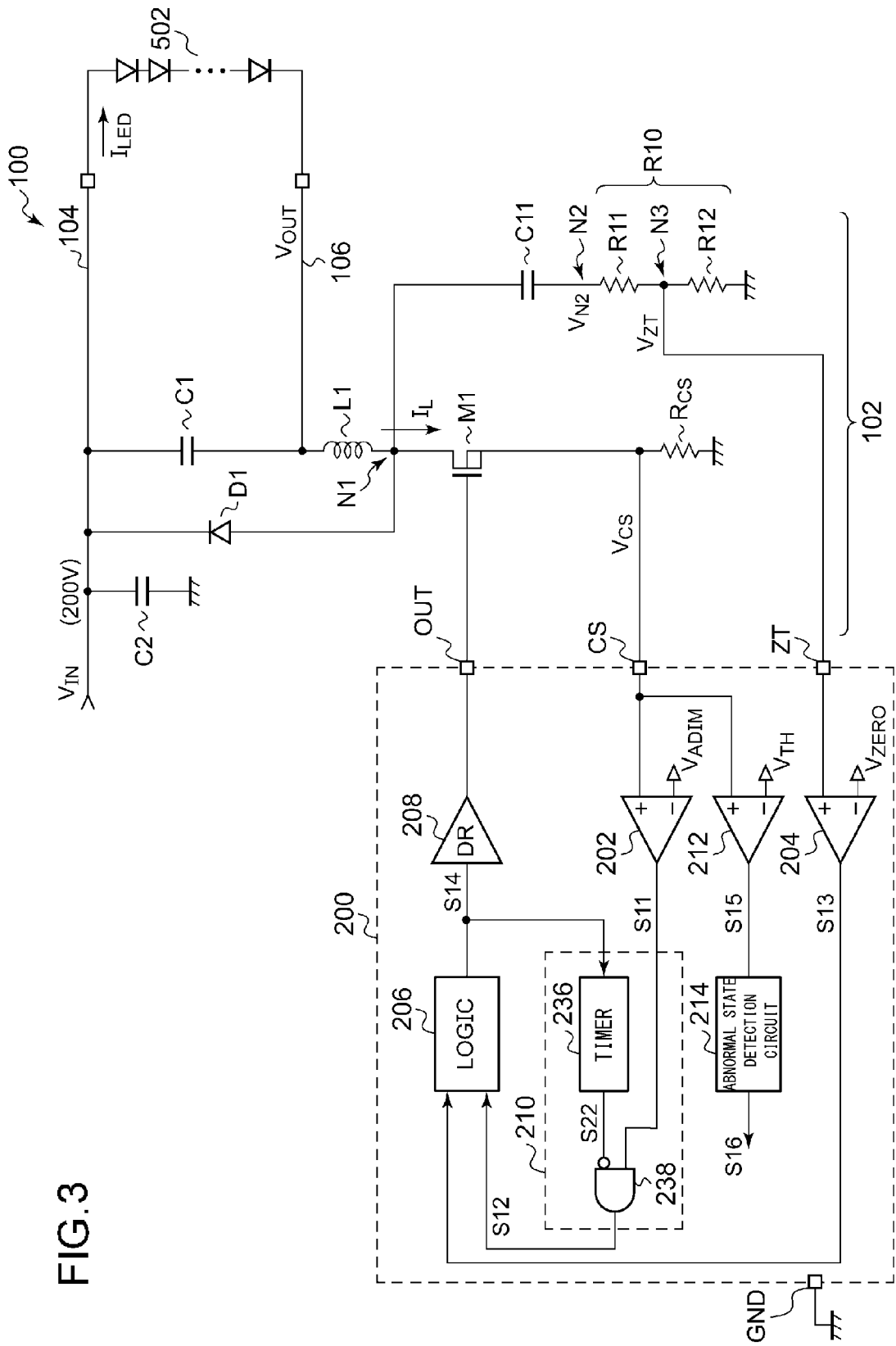
FIG. 3 is a circuit diagram showing a configuration of a switching converter according to an embodiment.

FIG. 3 is a circuit diagram showing a configuration of a switching converter 100 according to an embodiment. The switching converter 100 is configured as a step-down converter (back converter) that steps down an input voltage $V_{IN}$ input via an input line 104, and outputs an output voltage $V_{OUT}$ thus stepped down via an output line 106. An LED light source 502 is arranged such that its one end (anode) is connected to the input line 104, and such that the other end thereof (cathode) is connected to the output line 106. A driving voltage ($V_{IN}$-$V_{OUT}$) is supplied across both ends of the LED light source 502.

The LED light source 502 is configured as a device to be driven using a constant current. Thus, the switching converter 100 stabilizes a current $I_{LED}$ that flows through the LED light source 502 to a target value. For example, the LED light source 502 may be configured as an LED string including multiple light-emitting elements (LEDs) connected in series. The switching converter 100 stabilizes the current $I_{LED}$ that flows through the LED light source 502 to a target current $I_{REF}$ that corresponds to a target luminance.

The output circuit 102 includes a smoothing capacitor C1, an input capacitor C2, a rectifier diode D1, a switching transistor M1, an inductor L1, and a detection resistor $R_{CS}$. The smoothing capacitor C1 is arranged such that its one end is connected to the input line 104 and its other end is connected to the output line 106.

The inductor L1 is arranged such that its one end is connected to the output line 106 and its other end is connected to the drain of the switching transistor M1. The detection resistor $R_{CS}$ is arranged on a path of the current $I_L$ that flows through the switching transistor M1 and the inductor L1 in a period in which the switching transistor M1 is turned on. The rectifier diode D1 is arranged such that its cathode is connected to the input line 104 and its anode is connected to a connection node N1 (drain) that connects the inductor L1 and the switching transistor M1.

The control circuit 200 is configured as a function IC (Integrated Circuit) monolithically integrated on a single semiconductor substrate. The control circuit 200 includes an output (OUT) terminal, a current detection (CS) terminal, an auxiliary (ZT) terminal, and a ground (GND) terminal. The GND terminal is grounded. The OUT terminal is connected to the gate of the switching transistor M1. A current detection signal $V_{CS}$ that corresponds to a voltage drop across the detection resistor $R_{CS}$ is input to the CS terminal. The switching transistor M1 may be built into the control circuit 200.

The control circuit 200 includes a first comparator (current limit comparator) 202, a set pulse generator (zero current detection circuit) 204, a logic circuit 206, a driver 208, an LEB (Leading Edge Blanking) circuit 210, a second comparator 212, and an abnormal state detection circuit 214.

When a current detection signal $V_{CS}$ exceeds a first threshold value (dimming setting value) $V_{ADIM}$, the current limit comparator 202 asserts (set to high level, for example) a reset pulse S11. The first threshold value $V_{ADIM}$ corresponds to a setting value for an analog dimming operation. The zero current detection circuit 204 generates a set pulse S13. The assertion (e.g., the high level) of the set pulse S13 represents an instruction to turn on the switching transistor M1.

The switching converter 100 shown in FIG. 3 is configured as a quasi-resonant (QR) converter. The switching transistor M1 performs a soft switching operation in which, when the current $I_L$ that flows through the inductor L1 becomes zero, the switching transistor M1 is turned on. The capacitor C11 and the resistor R10 are provided in order to detect the coil current $I_L$. When the voltage $V_{N2}$ at a connection node N2 that connects the capacitor C11 and the resistor R10 crosses a threshold value which is set in the vicinity of zero, the zero current detection circuit 204 asserts the set pulse S13. The voltage $V_{N2}$ at the connection node N2 may be directly input to the ZT terminal. Also, a voltage $V_{ZT}$ obtained by dividing the voltage $V_{N2}$ by means of resistors R11 and R12 may be input to the ZT terminal.

The zero current detection circuit 204 includes a comparator. When the voltage $V_{ZT}$ at the ZT terminal crosses a threshold voltage $V_{ZERO}$ which is set in the vicinity of zero, the comparator asserts (sets to high level, for example) the set pulse S13.

The LEB circuit 210 sets a mask period to a second time period τ2 from the time point at which the switching transistor M1 turns on. During the mask period τ2, the assertion of the reset pulse S11 is masked, i.e., is ignored. Specifically, the LEB circuit 210 outputs a masked reset pulse S12 to the logic circuit 206. That is to say, the second time τ2 set by the LEB circuit 210 determines the minimum width of the on time of the switching transistor M1.

The configuration of the LEB circuit 210 is not restricted in particular. For example, the LEB circuit 210 includes a second timer circuit 236 and a third gate 238. The second timer circuit 236 generates a second timer signal S22 which is asserted (set to high level, for example) during a second time period τ2 from the time point at which the switching transistor M1 turns on. The third gate 238 receives the second timer signal S22 and the reset pulse S11, and generates a masked reset pulse S12. In a simplest configuration, the third gate 238 is configured as an AND gate that generates the logical AND of the reset pulse S11 and the inverted signal obtained by inverting the second timer signal S22.

The logic circuit 206 receives the set pulse S13 and the reset pulse S12, and generates an output pulse S14. (i) When the set pulse S13 is asserted, the output pulse S14 transits to an on level (e.g., high level) that corresponds to the on state of the switching transistor M1. (ii) When the reset pulse S12 is asserted, the output pulse S14 transits to an off level (e.g., low level) that corresponds to the off state of the switching transistor M1.

The driver 208 switches on and off the switching transistor M1 according to the output pulse S14. In the present embodiment, the signal output via the OUT terminal is the same as the output pulse S14.

When the current detection signal $V_{CS}$ exceeds a second threshold value $V_{TH}$, the second comparator 212 asserts (sets to high level, for example) a comparison signal S15. Here, a first time period τ1 from the time point at which the switching transistor M1 turns on is defined as an abnormal state detection period. When the comparison signal S15 is asserted in the abnormal state detection period τ1, the abnormal state detection circuit 214 judges that an abnormal state has occurred, and asserts (sets to high level, for example) an abnormal state judgment signal S16. When judgment has been made that an abnormal state has occurred, the control circuit 200 suspends the switching operation of the switching transistor M1, and/or transmits a notice to a microcontroller (not shown) configured as a peripheral component.

Figure 4:
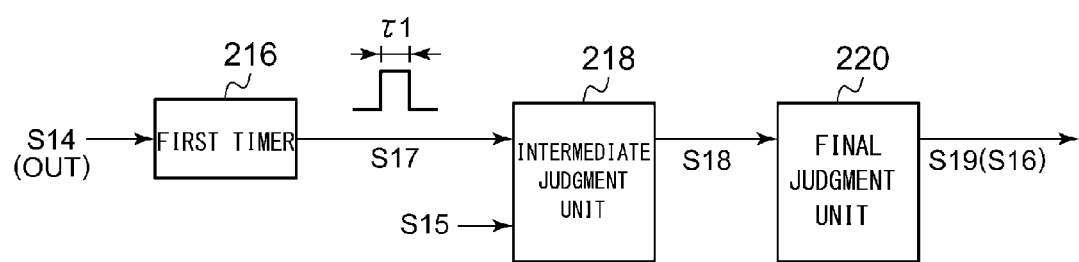
FIG. 4 is a block diagram showing an abnormal state detection circuit.

FIG. 4 is a block diagram showing the abnormal state detection circuit 214. The abnormal state detection circuit 214 includes a first timer circuit 216, an intermediate judgment unit 218, and a final judgment unit 220. The first timer circuit 216 generates a first timer signal S17 which is asserted (set to high level) during an abnormal state detection period, i.e., for the first time period τ1 from the time point at which the switching transistor M1 turns on. The intermediate judgment unit 218 receives the first timer signal S17 and the comparison signal S15, and outputs an intermediate judgment signal S18. The intermediate judgment signal S18 is configured such that (i) when both the first timer signal S17 and the comparison signal S15 are asserted, the intermediate judgment signal S18 is asserted (set to high level), and such that (ii) when the first timer signal S17 is negated (set to low level) and the comparison signal S15 is asserted, the intermediate judgment signal S18 is negated (set to low level).

The final judgment unit 220 generates a final judgment signal S19 (abnormal state signal S16 shown in FIG. 3) based on the intermediate judgment signal S18. In the present embodiment, the abnormal state judgment condition is that the assertion of the comparison signal S15 that occurs in the abnormal state detection period continues during a predetermined judgment time period τ3. That is to say, when the intermediate judgment signal S18 is continuously asserted without being cancelled during the judgment time period τ3, the final judgment unit 220 asserts the final judgment signal S19.

The first time period τ1 and the second time period τ2 may be the same, or may be different from each other. In a case in which the first time period τ1 and the second time period τ2 are the same, the second timer circuit 236 shown in FIG. 3 and the first timer circuit 216 shown in FIG. 4 may be configured using a single shared timer, thereby providing a reduced circuit area.

Figure 5:
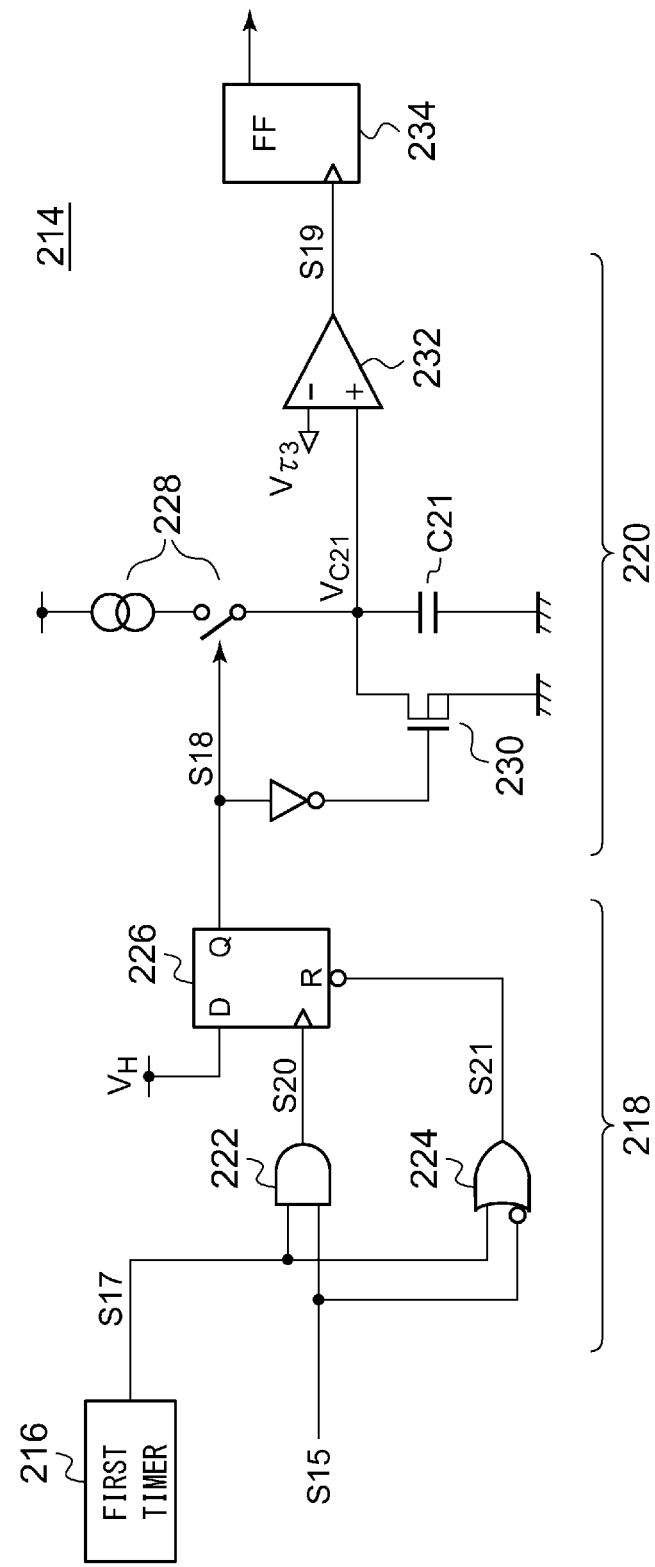
FIG. 5 is a circuit diagram showing an example configuration of the abnormal state detection circuit.

FIG. 5 is a circuit diagram showing an example configuration of the abnormal state detection circuit 214. The intermediate judgment unit 218 includes a first gate 222, a second gate 224, and a flip-flop 226. The first gate 222 receives the first timer signal S17 and the comparison signal S15, and generates an abnormal state detection signal S20. When the timer signal S17 is asserted and the comparison signal S15 is asserted, the abnormal state detection signal S20 is asserted. In a simplest configuration, the first gate 222 is configured as an AND gate. However, the configuration of the first gate 222 is not restricted in particular.

The second gate 224 receives the first timer signal S17 and the comparison signal S15, and generates a cancel signal S21. When the first timer signal S17 is negated and the comparison signal S15 is asserted, the cancel signal S21 is asserted. The second gate 224 may be configured as a combination of an OR gate and an inverter. Also, the second gate 224 may have other configurations.

The flip-flop 226 is arranged such that its clock terminal receives the abnormal state detection signal S20, such that its reset terminal (logical inversion) receives the cancel signal S21, and such that the intermediate judgment signal S18 is output. When the abnormal state detection signal S20 is asserted, the intermediate judgment signal S18 is asserted, and when the cancel signal S21 is asserted, the intermediate judgment signal S18 is negated.

The final judgment unit 220 includes a capacitor C21, a current source 228, a switch 230, and a comparator 232. The current source 228 charges the capacitor C21 during a period in which the intermediate judgment signal S18 is asserted. When the intermediate judgment signal S18 is negated, the switch 230 is turned on, which discharges the capacitor C21. The comparator 232 compares a voltage $V_{C21}$ that occurs at the capacitor C21 with a predetermined threshold voltage $V_{\tau 3}$, and outputs the final judgment signal S19. The threshold voltage $V_{\tau 3}$ is determined based on the judgment period τ3. For example, the final judgment signal S19 is latched by a latch (flip-flop) 234, and a predetermined protection operation is executed.

Figure 6:
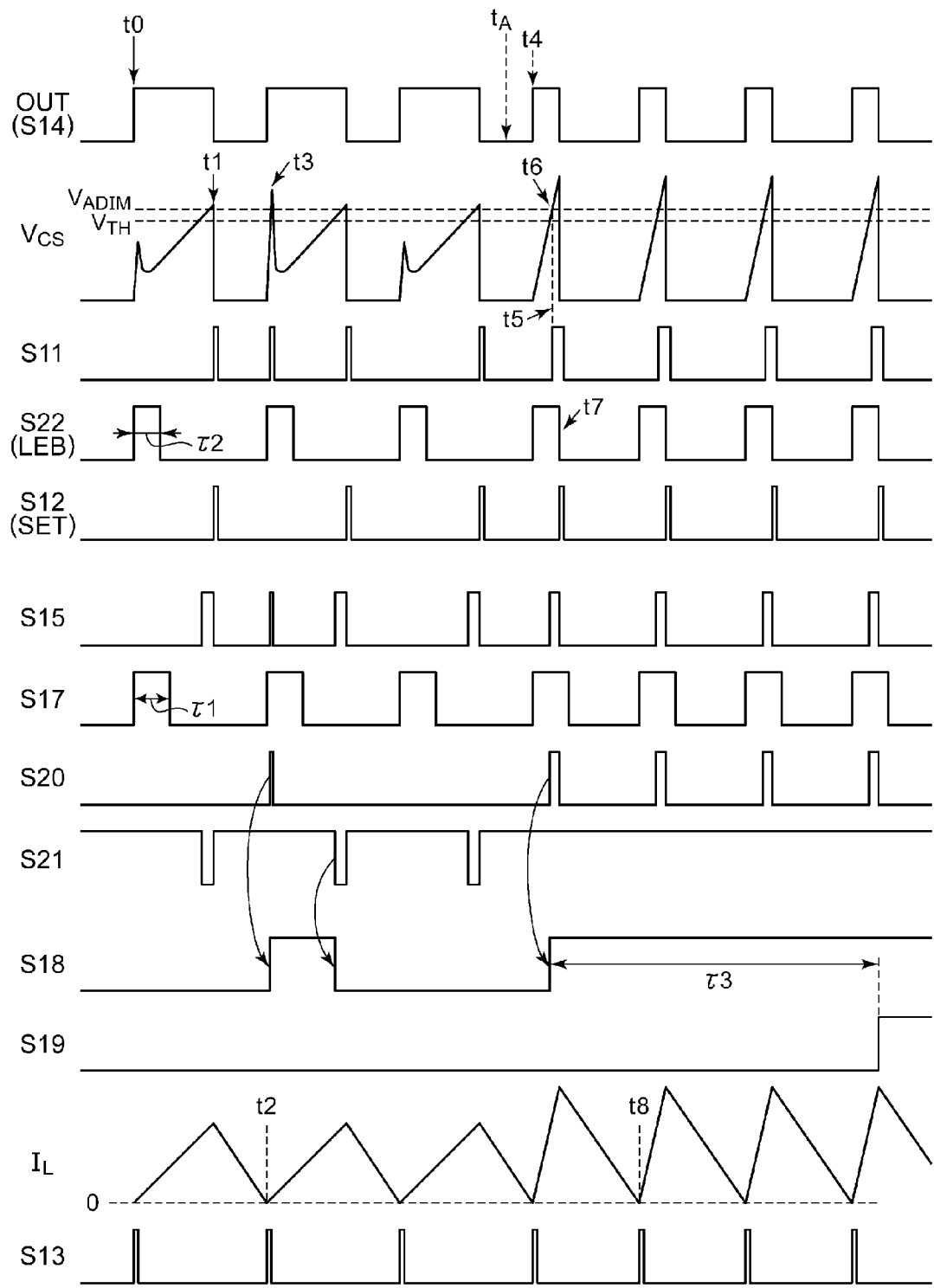
FIG. 6 is an operation waveform diagram showing the operation of a control circuit.

The above is the configuration of the control circuit 200. Next, description will be made regarding the operation thereof. FIG. 6 is an operation waveform diagram showing the operation of the control circuit 200. It should be noted that the vertical axis and the horizontal axis shown in the waveform diagrams and the time charts in the present specification are expanded or reduced as appropriate for ease of understanding. Also, each waveform shown in the drawing is simplified or emphasized for ease of understanding.

In this time chart, an operation is shown in a case in which τ1>τ2, and $V_{ADIM} > V_{TH}$. Before the time point $t_A$, the switching converter 100 and the LED light source 502 operate normally.

The reset pulse S11 is asserted every time the current detection signal $V_{CS}$ reaches the dimming setting value $V_{ADIM}$. At the time point t0, the output pulse S14 is set to the on level, which turns on the switching transistor M1. This increases the coil current $I_L$ that flows through the inductor L1, which raises the current detection signal $V_{CS}$. When the current detection signal $V_{CS}$ exceeds the dimming setting value $V_{ADIM}$ at the time point t1, the reset pulse S11 is asserted. This reset pulse S11 passes through the LEB circuit 210 without being masked, and is input to the logic circuit 206, which switches the output pulse S14 to the off level.

When the switching transistor M1 is turned off, the coil current $I_L$ decreases. When the coil current $I_L$ becomes zero at the time point t2, the zero current detection circuit 204 asserts the set pulse S13. This switches the output pulse S14 to the on level again. The control circuit 200 operates with a period between the time points t0 and t2 as its basic cycle.

As shown by the waveforms at the time point t3, the noise superimposed on the current detection signal $V_{CS}$ immediately after the switching transistor M1 turns on is masked by the LEB circuit 210. Thus, such noise has no effect on the switching operation.

In the normal state before the time point $t_A$, the cancel signal S21 is asserted (set to low level) for every cycle. Accordingly, even if the abnormal state detection signal S20 is asserted due to noise that occurs at the time point t3, in this normal state, the intermediate abnormal state judgment is reset according to the cancel signal S21 which is asserted in the next cycle. Thus, such an arrangement prevents false abnormal state judgment in the final stage.

Next, description will be made regarding the operation in an abnormal state. Let us consider a case in which a malfunction or an abnormal state such as a short-circuit state has occurred in the LED light source 502 at the time point $t_A$. In a case in which an abnormal state has occurred, a large voltage is applied to the inductor L1 immediately after the switching transistor M1 turns on at the time point t4, leading to a rapid speed of increase in the coil current $I_L$. As a result, the current detection signal $V_{CS}$ exceeds the threshold value $V_{TH}$ at the time point t5 after only a short period of time elapses after the switching transistor M1 turns on, which asserts the comparison signal S15. When the comparison signal S15 is asserted in the first time period τ1 after the switching transistor M1 turns on, the abnormal state detection signal S20 is asserted. When the abnormal state detection signal S20 is asserted, the intermediate judgment signal S18 is asserted, and the final judgment unit 220 starts time measurement.

At the time point t6, the current detection signal $V_{CS}$ exceeds the dimming setting value $V_{ADIM}$, which asserts the reset pulse S11. The LEB circuit 210 masks the assertion of the reset pulse S11 during the second time period τ2 from the time point at which the switching transistor M1 turns on. As a result, the output pulse S14 is set to the off level at the time point t7. Thus, the on time of the switching transistor M1 is set to the second time period τ2. When the coil current $I_L$ becomes zero at the time point t8, the output pulse S14 is set to the on level, which turns on the switching transistor M1. In such an abnormal state, the operation between the time points t4 and t8 is repeatedly performed.

In the normal state before the time point $t_A$, the cancel signal S21 is asserted (set to low level) for every cycle. In contrast, in an abnormal state, the cancel signal S21 is maintained in the negated state (high-level state). In this state, once the intermediate judgment signal S18 is asserted, this assertion is maintained. When the assertion of the intermediate judgment signal S18 continues during the judgment time period τ3, the final judgment signal S19 is asserted.

The above is the operation of the control circuit 200. With the control circuit 200, an abnormal state can be detected based on the waveform of the current detection signal $V_{CS}$ immediately after the switching transistor M1 turns on. Specifically, the control circuit 200 is capable of detecting an abnormal state based on the fact that the current detection signal $V_{CS}$ rises rapidly in an abnormal state.

The present inventor has found that, in some cases, depending on the circuit constant of the inductor L1, the capacitor C1, or the like, of the switching converter 100, a high voltage is applied to the inductor L1 immediately after the start-up of the switching converter 100, leading to a problem in that the current detection signal $V_{CS}$ rises rapidly even if the switching converter 100 operates normally.

In order to solve such a problem, with the embodiment, when the assertion of the comparison signal S15 that occurs in the abnormal state detection period τ1 continues for a predetermined judgment time period τ3, judgment is made that an abnormal state has occurred. Thus, by making an abnormal state judgment using the judgment time period τ3 set to be longer than the start-up time, such an arrangement is capable of preventing false detection in the start-up operation.

Description will be made again directing attention to FIG. 6. After the time point $t_A$ at which an abnormal state has occurred, the pulse width (on time) of the output pulse S14 becomes equal to the minimum on time determined by the second time period τ2. Thus, it can also be understood that, when the pulse width of the output pulse S14 remains the same for a predetermined time or otherwise for a predetermined number of cycles as the minimum pulse width (minimum on time) determined by the LEB circuit 210, the abnormal state detection circuit 214 of the control circuit 200 judges that an abnormal state has occurred.

The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

[First Modification]

Figure 7:
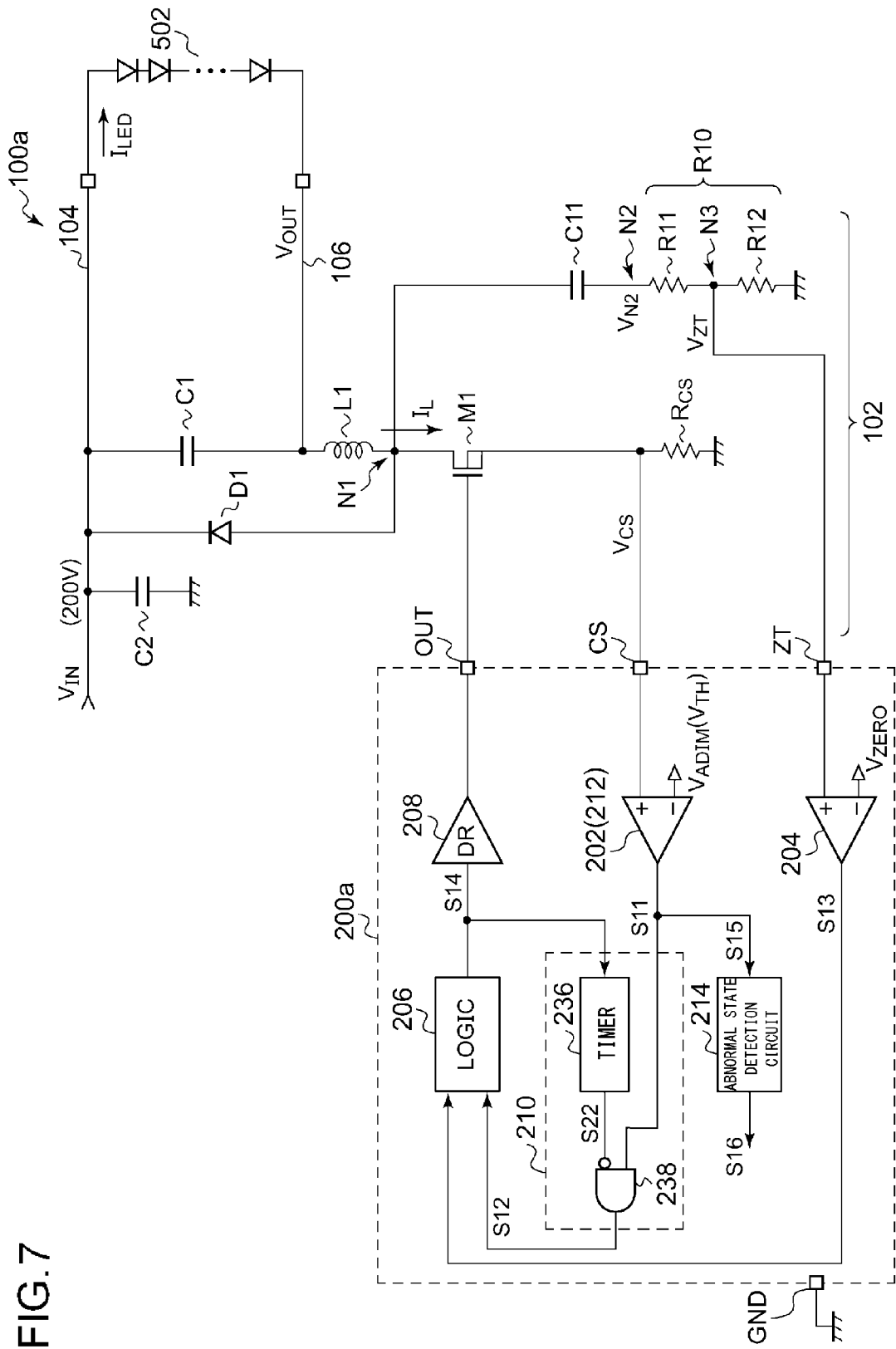
FIG. 7 is a circuit diagram showing a switching converter according to a first modification.

FIG. 7 is a circuit diagram showing a switching converter 100a according to a first modification. The output circuit 102 has the same configuration as that shown in FIG. 3. In the control circuit 200a according to the first modification, the dimming setting value (first threshold value) $V_{ADIM}$ and the threshold voltage (second threshold value) $V_{TH}$ are set to the same value. Furthermore, the current limit comparator 202 and the second comparator 212 are configured using a single shared comparator. Moreover, the output of the current limit comparator 202 functions as both the reset pulse S11 and the comparison signal S15. Such a modification provides a reduced number of comparators, thereby providing a reduced circuit area.

[Second Modification]

There is a difference in the operation of the abnormal state detection circuit 214 between the second modification and the embodiment as described above. In the second modification, when the assertion of the comparison signal S15 that occurs in the abnormal state detection period continues throughout a predetermined number of cycles, i.e., throughout N cycles, judgment is made that an abnormal state has occurred.

Description will be made with reference to FIG. 4. The operations of the first timer circuit 216 and the intermediate judgment unit 218 are the same as described above. In the second modification, the final judgment unit 220 receives the intermediate judgment signal S18 and the output pulse 4 (OUT). When the output pulse S14 transits to the on level a predetermined of times, i.e., N times, during a period in which the intermediate judgment signal S18 is asserted, the final judgment signal S19 is asserted.

Figure 8:
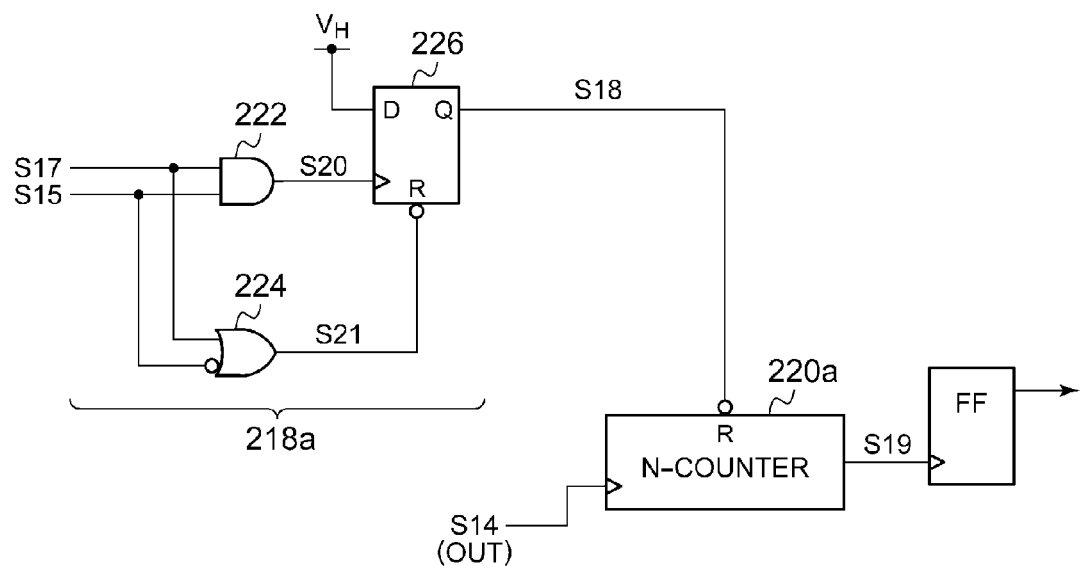
FIG. 8 is a circuit diagram showing an abnormal state detection circuit according to a second modification.

FIG. 8 is a circuit diagram showing an abnormal state detection circuit 214 according to the second modification. The intermediate judgment unit 218 has the same configuration as that shown in FIG. 5. The final judgment unit 220a includes a counter arranged such that the output pulse S14 is input to its clock terminal, and such that the intermediate judgment signal S18 is input to its reset terminal (logical inversion). The count value of the counter 220a is incremented according to the output pulse S14 during a period in which the intermediate judgment signal 18 is asserted (set to high level). When the count value reaches the predetermined value N, the final judgment signal S19 is asserted. Such a modification also provides the same effects as those provided by the embodiment.

[Third Modification]

The abnormal state detection circuit 214 may disable abnormal state detection during a predetermined time period after the start-up operation. Such a modification is capable of preventing false detection of an abnormal state immediately after the start-up operation.

[Fourth Modification]

Figure 9:
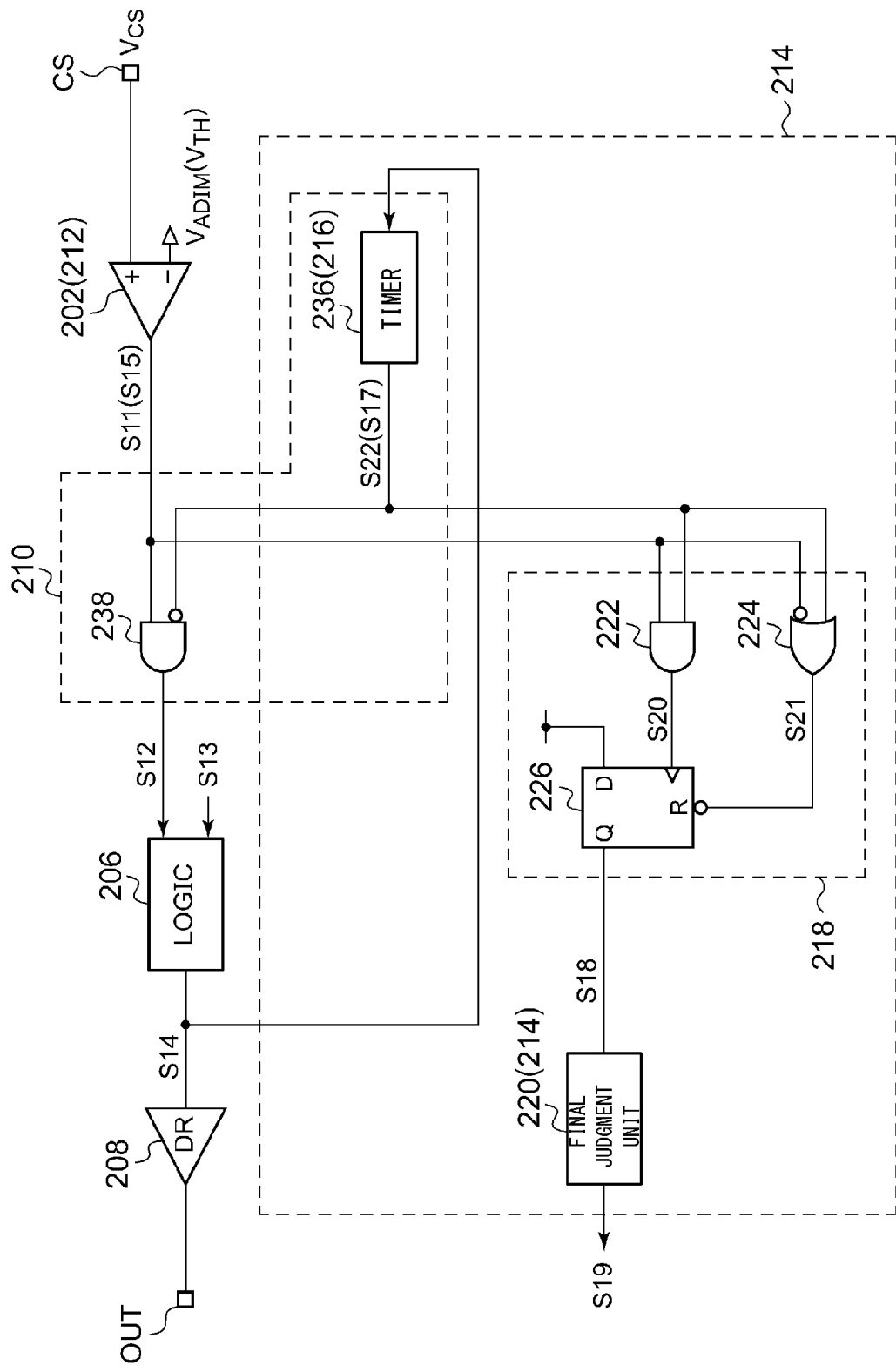
FIG. 9 is a circuit diagram showing a control circuit according to a fourth modification.

The first time period τ1 set for the abnormal state detection may be the same as the second time period τ2 set for the LEB operation. In this case, the first timer circuit 216 and the second timer circuit 236 may be configured as a single shared timer circuit, thereby providing a reduced circuit area. FIG. 9 is a circuit diagram showing a control circuit 200b according to a fourth modification. In this modification, the timer circuit 236 (216) is shared by the LEB circuit 210 and the abnormal state detection circuit 214.

The first gate 222 receives the timer signal S22 (S17) and the reset pulse S11 (S15). The first gate 222 outputs the abnormal state detection signal S20 which is asserted when the timer signal S22 is asserted and the reset pulse S11 is asserted. The second gate 224 receives the timer signal S22 (S17) and the reset pulse S11. The second gate 224 outputs the cancel signal S21 which is asserted when the timer signal S22 is negated and the reset pulse S11 is asserted. The flip-flop 226 is arranged such that the abnormal state detection signal S20 is input to its clock terminal, and such that the cancel signal S21 is input to its reset terminal (logical inversion). The flip-flop 226 outputs the intermediate judgment signal S18. The third gate 238 performs a logical operation on the timer signal S22 and the reset pulse S11, so as to generate the masked reset pulse S12. Such a modification allows the configuration of the control circuit 200 to be dramatically simplified.

[Fifth Modification]

Figure 10:
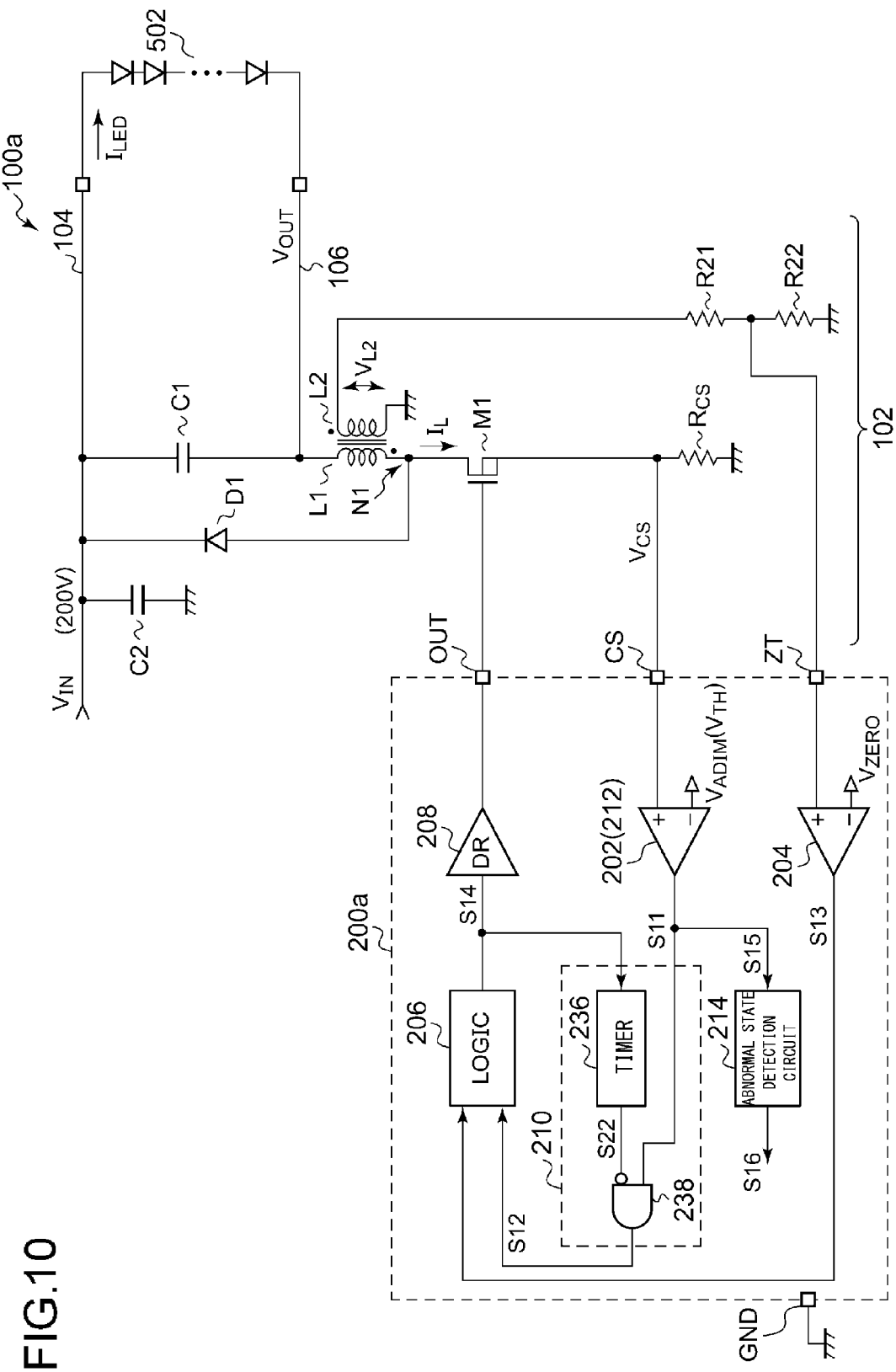
FIG. 10 is a circuit diagram showing a switching converter according to a fifth modification.

FIG. 10 is a circuit diagram showing a switching converter 100b according to a fifth modification. The switching converter 100b includes an auxiliary winding L2 coupled with the inductor L1, instead of the capacitor C11 and the resistor R10. The voltage $V_{ZT}$, which corresponds to a voltage $V_{L2}$ that occurs at the auxiliary winding L2, is input to the ZT terminal of the control circuit 200b. When the voltage $V_{ZT}$, which corresponds to a voltage at the auxiliary winding L2, crosses a predetermined threshold voltage $Z_{ZERO}$, a zero current detection circuit (set pulse generator) 204 asserts the set pulse S13. Such a configuration also provides a quasi-resonant mode.

[Sixth Modification]

Description has been made in the embodiment regarding the switching converter 100 configured as a quasi-resonant converter. However, the present invention is not restricted to such an arrangement. Also, the present invention is applicable to a separately-excited converter. In this case, the set pulse generator 204 may be configured employing a timer circuit that asserts the set pulse S13 after a predetermined off time period $T_{OFF}$ elapses from the time point at which the switching transistor M1 turns on.

[Seventh Modification]

The settings of the signals in a logic circuit, such as the high-level state and the low-level state of the signals, have been described in the present embodiments for exemplary purposes only. The settings can be freely modified by inverting the signals using inverters or the like.

[Eighth Modification]

Description has been made in the embodiment regarding an arrangement in which the LED light source 502 is configured as an LED string. However, the kind of load is not restricted in particular.

Also, various kinds of combinations of the aforementioned embodiments and modifications may be made, which are also effective as an embodiment of the present invention.

Figure 11:
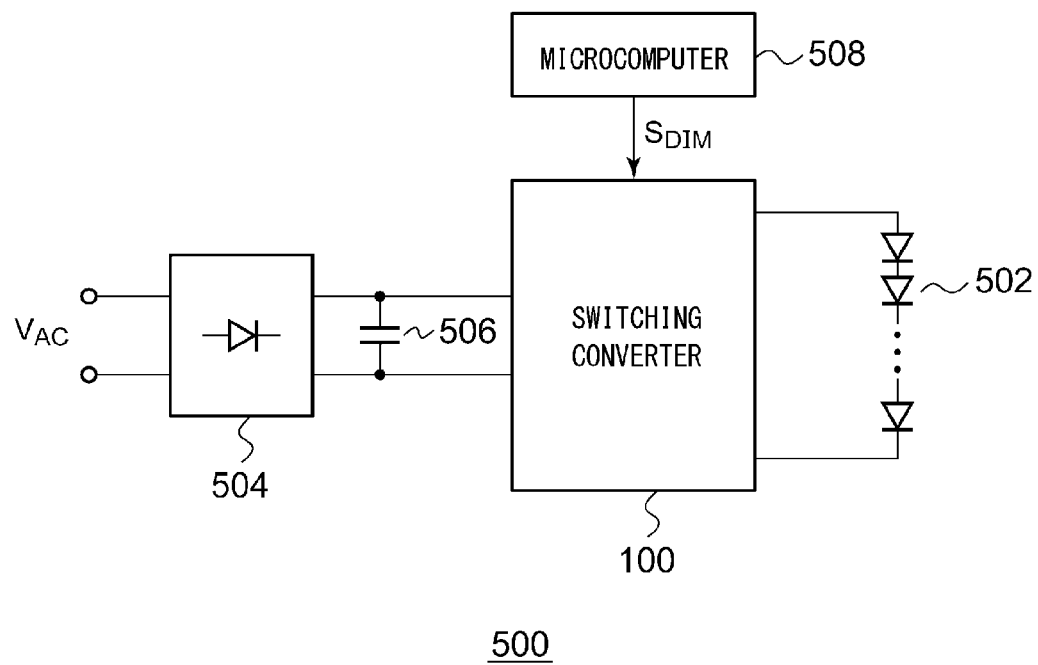
FIG. 11 is a block diagram showing an illumination apparatus employing a switching converter.

Lastly, description will be made regarding the usage of the switching converter 100. FIG. 11 is a block diagram showing the illumination apparatus 500 employing the switching converter 100. The illumination apparatus 500 includes a rectifier circuit 504, a smoothing capacitor 506, and a microcomputer 508, in addition to the LED light source 502 configured as a light emitting unit and the switching converter 100. A commercial AC voltage $V_{AC}$ is converted into a DC voltage $V_{DC}$ by rectifying and smoothing the commercial AC voltage $V_{AC}$ by means of the rectifier circuit 504 and the smoothing capacitor 506. The microcomputer 508 generates a control signal $S_{DIM}$ which indicates the luminance to be provided by the LED light source 502. The switching converter 100 receives the DC voltage $V_{DC}$ as an input signal $V_{IN}$, and supplies the driving current $I_{LED}$ that corresponds to the control signal $S_{DIM}$ to the LED light source 502.

Figure 12A:
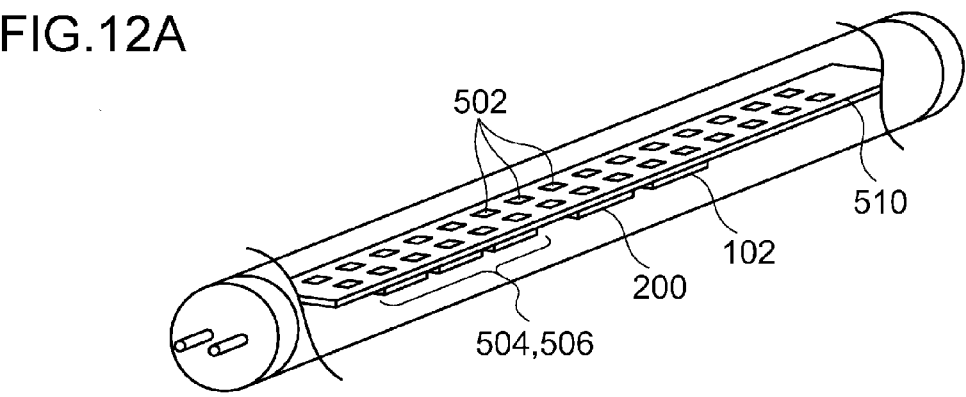
FIGS. 12A through 12C are diagrams each showing a specific example of the illumination apparatus.
Figure 12B:
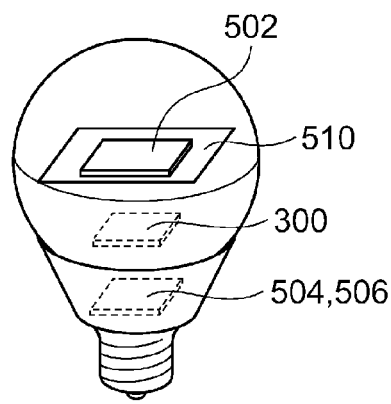
Figure 12C:
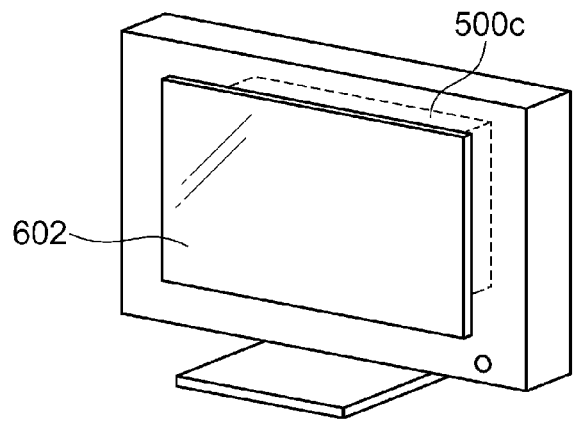

FIGS. 12A through 12C are diagrams each showing a specific example of the illumination apparatus 500. It should be noted that FIGS. 12A through 12C do not show all the components, i.e., a part of such components is not shown.

FIG. 12A shows an illumination apparatus 500a configured as a straight-tube-type LED illumination device. Multiple LED elements that form an LED string configured as the LED light source 502 are laid out on a substrate 510. Also, the rectifier circuit 504, the control circuit 200, the output circuit 102, and the like are mounted on the substrate 510.

FIG. 12B shows an illumination apparatus 500b configured as a bulb-type LED illumination device. An LED module configured as the LED light source 502 is mounted on the substrate 510. The control circuit 200 and the rectifier circuit 504 are mounted within a housing of the illumination apparatus 500b.

FIG. 12C shows an illumination apparatus 500c configured as a backlight built into a liquid crystal display apparatus 600. The illumination apparatus 500c irradiates the back face of a liquid crystal panel 602.

Aldo, the illumination apparatus 500 may be employed as a ceiling light. As described above, the illumination apparatus 500 shown in FIG. 11 is applicable to various kinds of usages.

While the preferred embodiments of the present invention have been described using specific terms, such description is for illustrative purposes only, and it is to be understood that changes and variations may be made without departing from the spirit or scope of the appended claims.

What is claimed is:

1. A control circuit for a switching converter, the switching converter comprising:
    an output capacitor arranged between an input line and an output line;
    an inductor, a switching transistor, and a detection resistor arranged in series between the output line and a ground line; and
    a diode having a cathode connected to the input line and an anode connected to a connection node that connects the inductor and the switching transistor,
    and wherein the control circuit comprises:
        a first comparator that asserts a reset pulse when a current detection signal that corresponds to a voltage drop across the detection resistor exceeds a first threshold value;
        a set pulse generator that asserts a set pulse at a timing at which the switching transistor is to be turned on;
        a logic circuit that receives the set pulse and the reset pulse, and that generates an output pulse such that (i) when the set pulse is asserted, the output pulse is switched to an on level that corresponds to an on state of the switching transistor, and such that (ii) when the reset pulse is asserted, the output pulse is switched to an off level that corresponds to an off state of the switching transistor;
        a second comparator that asserts a comparison signal when the current detection signal exceeds a second threshold value; and
        an abnormal state detection circuit that sets an abnormal state detection period to a period from a time point at which the switching transistor turns on up to a time point at which a first time period elapses, and that judges that an abnormal state has occurred when the comparison signal is asserted in the abnormal state detection period.

2. The control circuit according to claim 1, wherein the first threshold value and the second threshold value are equivalent, wherein the first comparator and the second comparator are configured employing a single shared comparator, and wherein the reset pulse is the same as the comparison signal.

3. The control circuit according to claim 1, wherein the abnormal state detection circuit judges that an abnormal state has occurred when assertion of the comparison signal that occurs in the abnormal state detection period continues throughout a predetermined judgment time period.

4. The control circuit according to claim 3, wherein the abnormal state detection circuit comprises:
a first timer circuit that generates a first timer signal that is asserted during the first time period from the time point at which the switching transistor turns on;
an intermediate judgment unit that receives the first timer signal and the comparison signal, and that outputs an intermediate judgment signal such that (i) when the first timer signal is asserted and the comparison signal is asserted, the intermediate judgment signal is asserted, and such that (ii) when the first timer signal is negated and the comparison signal is asserted, the intermediate judgment signal is negated; and
a final judgment unit that asserts a final judgment signal when the intermediate judgment signal is continuously asserted throughout the judgment time period.

5. The control circuit according to claim 1, wherein, when assertion of the comparison signal that occurs in the abnormal state detection period continues throughout a predetermined number of cycles, the abnormal state detection circuit judges that an abnormal state has occurred.

6. The control circuit according to claim 5, wherein the abnormal state detection circuit comprises:
a first timer circuit that generates a first timer signal which is asserted during the first time period from the time point at which the switching transistor turns on;
an intermediate judgment unit that receives the first timer signal and the comparison signal, and that outputs an intermediate judgment signal such that (i) when the first timer signal is asserted and the comparison signal is asserted, the intermediate judgment signal is asserted, and such that (ii) when the first timer signal is negated and the comparison signal is asserted, the intermediate judgment signal is negated; and
a final judgment unit that receives the intermediate judgment signal and the output pulse, and that asserts a final judgment signal when the output pulse transits to the on level the predetermined number of times in a period in which the intermediate judgment signal is asserted.

7. The control circuit according to claim 4, wherein the intermediate judgment unit comprises:
a first gate that receives the first timer signal and the comparison signal, and that outputs an abnormal state detection signal which is asserted when the first timer signal is asserted and the comparison signal is asserted;
a second gate that receives the first timer signal and the comparison signal, and that outputs a cancel signal which is asserted when the first timer signal is negated and the comparison signal is asserted; and
a flip-flop that receives the abnormal state detection signal via a clock terminal thereof, that receives the cancel signal via a reset terminal thereof, and that outputs an intermediate judgment signal such that, when the abnormal state detection signal is asserted, the intermediate judgment signal is asserted, and such that, when the cancel signal is asserted, the intermediate judgment signal is negated.

8. The control circuit according to claim 6, wherein the intermediate judgment unit comprises:
a first gate that receives the first timer signal and the comparison signal, and that outputs an abnormal state detection signal which is asserted when the first timer signal is asserted and the comparison signal is asserted;
a second gate that receives the first timer signal and the comparison signal, and that outputs a cancel signal which is asserted when the first timer signal is negated and the comparison signal is asserted; and
a flip-flop that receives the abnormal state detection signal via a clock terminal thereof, that receives the cancel signal via a reset terminal thereof, and that outputs an intermediate judgment signal such that, when the abnormal state detection signal is asserted, the intermediate judgment signal is asserted, and such that, when the cancel signal is asserted, the intermediate judgment signal is negated.

9. The control circuit according to claim 4, wherein the final judgment unit comprises:
a capacitor;
a current source that charges the capacitor during a period in which the intermediate judgment signal is asserted;
a switch that discharges the capacitor when the intermediate judgment signal is negated; and
a comparator that compares a voltage across the capacitor with a predetermined threshold voltage.

10. The control circuit according to claim 6, wherein the final judgment unit comprises a counter arranged such that the output pulse is input to a clock terminal thereof, and such that the intermediate judgment signal is input to a reset terminal thereof.

11. The control circuit according to claim 1, wherein the abnormal state detection circuit disables abnormal state detection during a predetermined period of time after a start-up operation.

12. The control circuit according to claim 1, wherein a mask period is set to a second time period from a time point at which the switching transistor turns on,
and wherein the control circuit further comprises a leading edge blanking circuit that masks assertion of the reset pulse during the mask period, and that outputs a masked reset pulse to the logic circuit.

13. The control circuit according to claim 11, wherein the first time period and the second time period are equivalent.

14. The control circuit according to claim 11, wherein the leading edge blanking circuit comprises:
a second timer circuit that generates a second timer signal which is asserted during the second time period from the time point at which the switching transistor turns on; and
a third gate that receives the second timer signal and the reset pulse, and that generates a masked reset pulse.

15. The control circuit according to claim 11, wherein the first time period and the second time period are equivalent,
wherein the first comparator and the second comparator are configured employing a single shared comparator,
and wherein the reset pulse and the comparison signal are configured as a single signal.

16. The control circuit according to claim 14, wherein the abnormal detection circuit and the leading edge blanking circuit share a timer circuit that generates a timer signal which is set to a predetermined level during the second time period from the time point at which the switching transistor turns on,
wherein the abnormal state detection circuit comprises:
a first gate that receives the timer signal and the reset pulse, and that outputs an abnormal state detection signal which is asserted when the timer signal is asserted and the reset pulse is asserted;

a second gate that receives the timer signal and the reset pulse, and that outputs a cancel signal which is asserted when the timer signal is negated and the reset pulse is asserted; and a flip-flop that receives the abnormal state detection signal via a clock terminal thereof, that receives the cancel signal via a reset terminal thereof, and that outputs an intermediate judgment signal such that, when the abnormal state detection signal is asserted, the intermediate judgment signal is asserted, and such that, when the cancel signal is asserted, the intermediate judgment signal is negated, and wherein the leading edge blanking circuit comprises a third gate that performs a logical operation on the timer signal and the reset pulse, so as to generate a masked reset pulse.

17. The control circuit according to claim 1, wherein the set pulse generator asserts the set pulse when a current that flows through the inductor becomes substantially zero.

18. The control circuit according to claim 1, wherein the switching converter further comprises a first capacitor and a first resistor arranged in series between a ground line and a connection node that connects the inductor and the switching transistor, and wherein, when an electric potential at the first resistor crosses a predetermined threshold voltage, the set pulse generator asserts the set pulse.

19. The control circuit according to claim 1, wherein the switching converter further comprises an auxiliary winding coupled with the inductor, and wherein, when a voltage that develops at the auxiliary winding crosses a predetermined threshold voltage, the set pulse generator asserts the set pulse.

20. The control circuit according to claim 1, wherein the set pulse generator asserts the set pulse after a predetermined off time period elapses from a time point at which the switching transistor turns on.

21. The control circuit according to claim 1, wherein, when an abnormal state is detected, the control circuit suspends an operation thereof.

22. The control circuit according to claim 1, monolithically integrated on a single semiconductor substrate.

23. A switching converter comprising the control circuit according to claim 1.

24. An illumination apparatus comprising:
an LED light source comprising a plurality of LEDs (light-emitting diodes) connected in series;
a rectifier circuit that rectifies and smooths a commercial AC voltage; and
a switching converter that receives, as an input voltage, a DC voltage obtained by rectification and smoothing by means of the rectifier circuit, and that is arranged such that the LED light source functions as a load,
and wherein the switching converter comprises the control circuit according to claim 1.

25. An electronic device comprising:
a liquid crystal panel; and
the illumination apparatus according to claim 24, configured as a backlight that irradiates a back face of the liquid crystal panel.

26. A control circuit for a switching converter, the switching converter comprising:
an output capacitor arranged between an input line and an output line;
an inductor, a switching transistor, and a detection resistor arranged in series between the output line and a ground line; and
a diode arranged such that a cathode thereof is connected to the input line, and such that an anode thereof is connected to a connection node that connects the inductor and the switching transistor,
and wherein the control circuit comprises:
a first comparator that asserts a reset pulse when a current detection signal that corresponds to a voltage drop across the detection resistor exceeds a first threshold value;
a leading edge blanking circuit that sets a mask period to a second time period from a time point at which the switching transistor turns on, that masks assertion of the reset pulse during the mask period, and that outputs a masked reset pulse;
a set pulse generator that asserts a set pulse at a timing at which the switching transistor is to be turned on;
a logic circuit that receives the set pulse and the masked reset pulse, and that generates an output pulse such that (i) when the set pulse is asserted, the output pulse is switched to an on level that corresponds to an on state of the switching transistor, and such that (ii) when the masked reset pulse is asserted, the output pulse is switched to an off level that corresponds to an off state of the switching transistor; and
an abnormal state detection circuit that judges that an abnormal state has occurred when a state in which a pulse width of the output pulse becomes the same as the second time period continues throughout a predetermined time period or otherwise throughout a predetermined number of cycles.

27. A control method for a switching converter, the switching converter comprising:
an output capacitor arranged between an input line and an output line;
an inductor, a switching transistor, and a detection resistor arranged in series between the output line and a ground line; and
a diode arranged such that a cathode thereof is connected to the input line, and such that an anode thereof is connected to a connection node that connects the inductor and the switching transistor,
and wherein the control method comprises:
asserting a reset pulse when a current detection signal that corresponds to a voltage drop across the detection resistor exceeds a first threshold value;
asserting a set pulse at a timing at which the switching transistor is to be turned on;
generating an output pulse based on the set pulse and the reset pulse such that (i) when the set pulse is asserted, the output pulse is switched to an on level that corresponds to an on state of the switching transistor, and such that (ii) when the reset pulse is asserted, the output pulse is switched to an off level that corresponds to an off state of the switching transistor;
asserting a comparison signal when the current detection signal exceeds a second threshold value; and
judging that an abnormal state has occurred when the comparison signal is asserted in an abnormal state detection period during a first time period from a time point at which the switching transistor turns on.

28. A control method for a switching converter, the switching converter comprising:
an output capacitor arranged between an input line and an output line;

an inductor, a switching transistor, and a detection resistor arranged in series between the output line and a ground line; and a diode arranged such that a cathode thereof is connected to the input line, and such that an anode thereof is connected to a connection node that connects the inductor and the switching transistor, and wherein the control method comprises:

asserting a reset pulse when a current detection signal that corresponds to a voltage drop across the detection resistor exceeds a setting value;

masking assertion of the reset pulse during a predetermined mask period from a time point at which the switching transistor turns on;

generating a set pulse configured as an instruction to turn on the switching transistor;

generating an output pulse based on the set pulse and the reset pulse after the masking, such that (i) when the set pulse is asserted, the output pulse is switched to an on level that corresponds to an on state of the switching transistor, and such that (ii) when the masked reset pulse is asserted, the output pulse is switched to an off level that corresponds to an off state of the switching transistor; and judging that an abnormal state has occurred when the reset pulse is asserted in the mask period from a time point at which the switching transistor turns on.

29. A control method for a switching converter, the switching converter comprising:

an output capacitor arranged between an input line and an output line;

an inductor, a switching transistor, and a detection resistor arranged in series between the output line and a ground line; and a diode arranged such that a cathode thereof is connected to the input line, and such that an anode thereof is connected to a connection node that connects the inductor and the switching transistor, and wherein the control method comprises:

asserting a reset pulse when a current detection signal that corresponds to a voltage drop across the detection resistor exceeds a setting value;

masking assertion of the reset pulse during a predetermined mask period from a time point at which the switching transistor turns on;

generating a set pulse configured as an instruction to turn on the switching transistor;

generating an output pulse based on the set pulse and the reset pulse after the masking, such that (i) when the set pulse is asserted, the output pulse is switched to an on level that corresponds to an on state of the switching transistor, and such that (ii) when the masked reset pulse is asserted, the output pulse is switched to an off level that corresponds to an off state of the switching transistor; and judging that an abnormal state has occurred when a state in which the output pulse has substantially the same pulse width as the mask period continues throughout a predetermined time period or otherwise throughout a predetermined number of cycles.

\* \* \* \* \*